Patented Oct. 10, 1933

1,930,391

UNITED STATES PATENT OFFICE 1,930,391

IMPRESSION COMPOUND

Carl E. Kellner, Engelwood, N. J.

No Drawing. Application April 30, 1931
Serial No. 534,136

4 Claims. (Cl. 18—47)

The present invention relates to impression material and has an object the provision of an elastic composition which is particularly applicable as a molding material to take casts or impressions of both animate and inanimate objects.

The elastic property of the said composition permits casts or impression molds made thereof to be distorted or stretched in effecting their removal from the object without breaking or marring the impression or the casting, and which will return to their original molded form after removal. It also has the advantage that a single casting may be made of an intricate object which would require it to be molded in parts if a stiff, unresilient material were used. Because of its elasticity it is particularly tough and will not fracture in ordinary use; it is therefore possible to obtain perfect casts of both animate and inanimate objects which have considerable undercut parts, without injuring the cast or requiring repair thereto after removal of the object.

Another object in view is the provision of an impression composition obtained by dissolving and combining in solution a nitrogeneous colloid with a soapy body and resin dissolved and combined with sodium borate. The composition so produced is fine in texture upon solidifying and is sufficiently viscous when in a liquid state to penetrate the minutest crevices in the object to obtain an impression of every minute detail thereof, even to the pores of the skin when making a casting of parts of the human body.

The material so produced has the further advantage that it is not sticky and will solidify quickly on cooling, and more of the heated liquid material may be poured on the solidified cast without adhering thereto, thus making it possible to obtain sectional molds one overlapping another. Impression casts of this material can be made of objects covered with bristles, hair, and the like, and no pulling or tearing of the hair results on the removal of the casting.

The composition is obtained by combining in solution nitrogenous colloids, either hydro colloids of vegetable origin such as agar-agar or gelatine animal hydro colloid, or both, with glycerine, and dissolving in the resulting solution a soapy body such as saponified glyceryl palmitate, oleate, or laurate, and an alkali such as sodium borate, and resin such as mastic gum, damar gum, or shellac. The resulting composition is reversible by heating and cooling, from a liquid to a solid, and so may be used over and over again any number of times, the continuous reheating and reuse of the material having no effect upon its chemical and physical properties with the exception of the evaporation of some of its water content, which can be replaced as desired when the material is in a liquid state. If desired, oil of wintergreen may be added in small quantity when the material is to be used on an animate object, to provide analgetic action and produce a soothing effect upon the skin.

In producing the material, the nitrogenous constituent, agar-agar and gelatine, are soaked in water separately for approximately four hours and then filtered through gauze and pressed to reduce the water content, after which they are mixed in a double boiler with glycerine and boiled for several hours until dissolved. The soapy body is then added to the boiling solution and dissolved therewith, after which resin ground to a powder and mixed with sodium borate is added to the hot solution and the mixture boiled or cooked until a homogeneous chemical solution is obtained.

The gum is reduced to a solution by the reaction therewith of sodium borate in the boiling operation and which combines with the resin to form alkali solution thereof. This solution dissolves with the other ingredients in solution to form the elastic impression composition.

The proportions of the various ingredients of the material may be varied in accordance with the use that is desired to be made of the material; for instance, if it is desired to use it on an inanimate object the material may be produced with gelatine and without a vegetable hydro colloid, but when it is for use on an animate object it is preferable that both vegetable and animal hydro colloids be used, as the vegetable hydro colloid agar-agar has a lower melting point than gelatine and the composition will therefore melt at a lower temperature, so that it can be applied directly to the human body without scalding effects.

The following proportions have been found to produce the composition having the properties hereinbefore described:

1. |   | Parts by weight |
   |---|---|
   | Soapy body | 50 |
   | Sodium borate | 50 |
   | Gum or resin | 50 |
   | Animal and vegetable hydro colloid | 50 |
   | Glycerine | 100 |

Water to be added to thin as desired.

2. |   | Parts by weight |
   |---|---|
   | Soapy body | 100 |
   | Sodium borate | 50 |
   | Gum or resin | 50 |
   | Animal and vegetable hydro colloid | 200 |
   | Glycerine | 100 |

Water to be added to thin as desired.

The composition melts at approximately 80° C. and may be applied to animate or inanimate objects in liquid form either by hand, plastic manipulation or with a brush at temperatures between 45° and 55° C. It solidifies quickly having the aforesaid elastic property so that it can be removed from the object at approximately 33° C. without injuring the cast.

I claim:

1. An elastic impression material containing a nitrogenous colloid, soap, sodium borate and resin combined in solution.

2. An elastic impression colloidal material containing a reversible nitrogenous colloid a soapy substance, and resin in solution with sodium borate.

3. An elastic composition containing in solution agar-agar and gelatine, glycerine, soap, resin and sodium borate.

4. An elastic composition containing in solution a nitrogenous colloid, glycerine, soap, resin and sodium borate.

CARL E. KELLNER.